No. 631,682.
F. B. STRONG.
DOMESTIC BOILER.
(Application filed Jan. 6, 1899.)
(No Model.)
Patented Aug. 22, 1899.
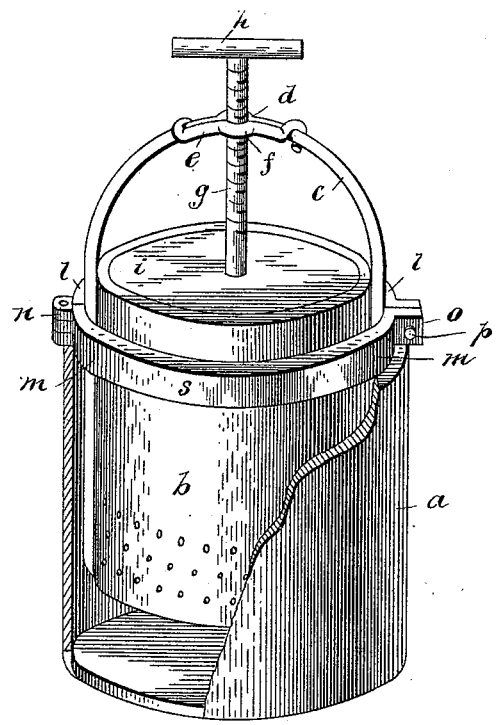
Witnesses.
E. C. Duffy
Geo. C. Shoemaker
Inventor.
Franklin B. Strong
by Chandler & Chandler
Attorneys

UNITED STATES PATENT OFFICE.

FRANKLIN B. STRONG, OF GREENFIELD, MISSOURI.

DOMESTIC BOILER.

SPECIFICATION forming part of Letters Patent No. 631,682, dated August 22, 1899.

Application filed January 6, 1899. Serial No. 701,358. (No model.)

*To all whom it may concern:*

Be it known that I, FRANKLIN B. STRONG, a citizen of the United States, residing at Greenfield, in the county of Dade, State of Missouri, have invented certain new and useful Improvements in Domestic Boilers; and I do hereby declare the following to be a full, clear, and exact description of the invention, such as will enable others skilled in the art to which it appertains to make and use the same.

My invention relates to boilers in general, and more particularly to that class designed for boiling vegetables, &c., the object of my invention being to provide simple and effective means for draining the water from the materials boiled and also for mashing them.

A further object of my invention is to provide a colander within the boiler and in which the materials are cooked, so that after being boiled and drained they may be mashed through the colander.

In the drawings I have shown a boiling pot or boiler having my improved masher, drainer, and colander arranged therein.

Referring now to the drawings, *a* represents an ordinary boiling-pot, showing the application of my invention thereto. Within the pot *a* I arrange a vessel *b*, which is perforated at and adjacent its bottom, and extending in the form of a bail above the vessel *b* is a strap *c*, the ends of which are extended downwardly of the exterior of the vessel, as shown, said ends being soldered or otherwise secured to the vessel and forming vertical ribs on opposite sides thereof. The strap or bail *c* is bent laterally at its uppermost portion, as shown at *d*, and coöperating with said bent strap or bail is an oppositely-extending bend of a strap *e*, one end of which is bent around the bail *c*, and the other end is bent to form a hook which is engaged with the bail on the opposite side of the bend *d*. This bend *f* in the strap *e* forms, in connection with the bend *d*, a circular inclosure which is internally threaded to receive a screw *g*, having an operating-handle *h*.

To the lower end of the screw *g* is attached a plate *i*, which fits snugly within the vessel *b* and is adapted to be forced thereinto by means of the screw *g*.

In order to adjust the vessel within a pot *a*, I provide a ring comprising two parts *l* and *m*, which are hinged together at *n*, the opposite ends of the sections being bent outwardly, as shown at *o*, where they are provided with alining perforations through which is passed a clamping-bolt *p*.

The operation of my device is as follows: The pot *a* having had the desired quantity of water contributed to it, the ring *s* is secured to the exterior of the vessel *b* and is clamped thereon at such a height that the ring will rest upon the upper edge of the pot and the lower portion of the vessel will enter the water in the pot. The materials to be boiled are then placed in the vessel *b*. The strap *e* is then unhooked from the bail *c*, and the screw *g* is placed with its threads engaging those of the bend in the bail. The strap is then hooked to the bail, the plate *i* extending into the vessel *b*. By then screwing the screw *g* downwardly the plate *i* is engaged with the materials in the vessel, which after being boiled may be drained by lifting the vessel from the pot and may be then forced through the perforations in the vessel *b* by compression of the plate *i*.

It will be readily understood that I may employ my invention in connection with any form of utensil to which it is adapted, and also that the ribs formed by the extensions of the bail *c* upon the vessel *b* prevent the vessel touching the pot, and thus allow space for the egress of steam.

Having thus described my invention, what I claim is—

1. In a device of the class described the combination of a vessel having perforations therein, a utensil adapted to receive the vessel a bail secured to the vessel, screw-threads carried by the bail, a screw in engagement with the threads of the bail, a plate carried by the screw and adapted to enter the vessel and a ring formed in parts and adapted to be clamped adjustably upon the exterior of the vessel and rest upon the rim of the utensil and support the vessel therein.

2. The combination with a utensil of the class described of a vessel having perforations therein, a ring clamped upon the vessel and adapted to rest upon the rim of the utensil and support the vessel, a bail secured to the vessel and extending vertically downward to form vertical ribs, a strap carried by the bail, opposite bends in the bail and strap forming a circular opening, threads in the opening, a
5 screw engaging the threads of the opening, and a plate carried by the screw and adapted to enter the vessel.

In testimony whereof I affix my signature in presence of two witnesses.

FRANKLIN B. STRONG.

Witnesses:
EDWIN HARRISON,
F. G. VAN OSDELL.